US005455389A

United States Patent [19]

Hirose et al.

[11] Patent Number: 5,455,389

[45] Date of Patent: Oct. 3, 1995

[54] CONDUCTOR CUTTING METHOD AND COIL PARTS

[75] Inventors: Tosiaki Hirose, Katano; Saburo Koresawa, Kadoma; Kazunori Nishida, Hirakata, all of Japan

[73] Assignee: Matsushita Electric Industrial Co., Ltd., Kadoma, Japan

[21] Appl. No.: 184,023

[22] Filed: Jan. 21, 1994

[30] Foreign Application Priority Data

Jan. 21, 1993 [JP] Japan .................................... 5-008096

[51] Int. Cl.$^{6}$ ............................... H01B 5/02; H01F 7/06; B23K 9/00; B23V 15/00

[52] U.S. Cl. ............................ 174/126.1; 29/605; 83/17; 83/18; 219/121.2; 219/121.44; 219/121.72

[58] Field of Search .......................... 174/126.1; 29/605; 83/17, 18; 219/121.72, 121.44, 121.2

[56] References Cited

U.S. PATENT DOCUMENTS

| | | | |
|---|---|---|---|
| 3,137,766 | 6/1964 | Teague | 174/126.1 |
| 3,383,188 | 5/1968 | Michelson | 29/183.5 |
| 3,443,914 | 5/1969 | Hayashi | 174/126.1 |
| 3,444,610 | 5/1969 | Thomson | 174/126.1 |
| 3,621,190 | 11/1971 | Morikawa et al. | 219/155 |
| 3,870,852 | 3/1975 | Kogert | 219/121.72 |
| 3,882,658 | 5/1975 | Cleary | 83/168 |
| 3,960,040 | 6/1976 | Gudmestad et al. | 83/18 |
| 4,251,911 | 2/1981 | Reynolds et al. | 29/605 |
| 4,419,814 | 12/1983 | Hasserjian | 29/605 |
| 4,467,972 | 8/1984 | Kaiser | 29/605 |
| 4,625,927 | 12/1986 | Arnold | 29/605 |
| 4,635,865 | 1/1987 | Arnold | 29/605 |
| 4,743,730 | 5/1988 | Martin et al. | 204/16 |
| 4,778,972 | 10/1988 | Josserand | 219/69 W |
| 4,879,804 | 11/1989 | Chiang | 29/605 |
| 4,938,907 | 7/1990 | Vowles et al. | 83/16 |
| 5,133,121 | 7/1992 | Birbeck et al. | 174/126.1 |
| 5,331,729 | 7/1994 | Moorehead | 29/605 |

FOREIGN PATENT DOCUMENTS

| | | |
|---|---|---|
| 0090565 | 10/1983 | European Pat. Off. . |
| 2061949 | 7/1974 | Germany . |
| 58-18317 | of 0000 | Japan . |
| 57-34641 | 7/1980 | Japan . |
| 58-56800 | 4/1983 | Japan . |
| 58-110021 | 6/1983 | Japan . |
| 62-199238 | 9/1987 | Japan . |

OTHER PUBLICATIONS

Soviet Inventions Illustrated, P,Q section, week D 31, Sep. 9, 1981, Derwent Publications Ltd. (SU–A–778 954 (Novch Poly)).

Soviet Inventions Illustrated, R section, week 9309, Apr. 21, 1993, Derwent Publications Ltd. (SU–A–1725 272 (Domen Res. Inst.)).

*Primary Examiner*—Morris H. Nimmo

*Attorney, Agent, or Firm*—Willian Brinks Hofer Gilson & Lione

[57] ABSTRACT

By applying a tension to the conductor to be cut off, and locally heating the intended cutting position to provide a temperature difference of 20° to 300° from other parts, the cutting position is lowered in tensile force as compared with other parts, and by applying a tension, the concentrated stress is added, and a large distortion is generated to cut off, so that the cutting position may be stabilized.

12 Claims, 10 Drawing Sheets

CONDUCTOR CUTTING METHOD AND COIL PARTS

FIELD OF THE INVENTION

The present invention relates to a conductor cutting method suited to manufacture of coil parts to be used in electronic circuits of computer, television receiver, audio appliance and others, and also to coil parts.

BACKGROUND OF THE INVENTION

Recently. the multifunctional trend is notable in the fields of electric household appliances, office automation equipment and others, and electronic circuits are employed widely also outside the electric industries, such as production facility industry and automotive industry. Accordingly, the use of coil parts winding conductors is intensively increased.

In coil parts winding conductors, hitherto, it is difficult to stabilize the cutting position of conductors, and the cutting method is one of the important subjects.

A conventional cutting method of conductors of coil parts is explained below. FIG. 13 is an example of coil winding machine for winding a conductor around a winding body (hereinafter called bobbin). For the ease of understanding of the conventional conductor cutting method, its principle and operation are described while referring to FIG. 13.

In FIG. 13, a mounting arm 1 has a bobbin 2 attached to its end as shown in the drawing. Opposite to the mounting arm 1, a spindle 9 is provided, and a conductor guide nozzle 7 is disposed at the front end of the spindle 9 through a flier 8, and a conductor 6 is supplied from this conductor guide nozzle 7. FIG. 13 shows the state of completely winding the conductor 6 around the bobbin 2.

Explaining the operation of this winding machine, the mounting arm 1 mounted on a rotary shaft (not shown) is rotated and displaced in the direction of arrow A about the rotary shaft, and a next mounting arm accommodating an empty bobbin 2 moves to position 1*a* confronting the spindle 9, while the mounting arm 1 being opposite to the spindle 9 moves to position 1*b*. At this time, the conductor 6 wound on a terminal 4*b* of the bobbin 2 mounted on the mounting arm 1 moving to position 1*b* bridges between the terminal 4*b* of the bobbin 2 and the conductor guide nozzle 7. In this state, the flier 8 moves in the direction of arrow X, and the conductor guide nozzle 7 is positioned near a terminal 4*a* of the bobbin 2 mounted on the mounting arm 1 moving to the position 1*a* confronting the spindle 9. In actual operation, when the mounting arm 1 is rotated and displaced, the flier 8 moves simultaneously, and the conductor guide nozzle 7 is positioned near the terminal 4*a*, so that the conductor does not sag in this move.

In this state, as the conductor guide nozzle 7 moves in the direction of arrow Y1 in a specific range about the terminal 4*a*, and moves in the direction of arrow X1, then moves in the direction of arrow Y2, and moves in the direction of arrow X2, then moves in the direction of arrow Z1, thus repeating, the flier 8 winds the conductor 6 near the root of the terminal 4*a*, thereby forming a winding wire 5*a*. At this time, a bridge conductor 6*a* between the terminal 4*b* of the bobbin 2 mounted on the mounting arm 1 moving to the position 1*b* and the terminal 4*a* of the bobbin 2 mounted on the mounting arm 1 moving to the position 1*a* confronting the spindle 9 is as shown in FIG. 13.

After this action is complete, the flier 8 prepares for winding the conductor to the bobbin 2, and the spindle 9 and bobbin 2 coincide in the center, and the conductor guide nozzle 7 moves so as to be positioned inside of the flange of the bobbin 2. In this state, the flier 8 rotates about the bobbin 2 in the direction of θ (or θ'), and simultaneously moves reciprocally at a specific ratio in the direction of X' or X, thereby forming a coil 3. When this action is over, the previous action is repeated to form a winding wire 5*b* on the terminal 4*b*. The state of completion of this operation is shown in FIG. 13, and the same operation is repeated sequentially thereafter.

Since the coil 3 wound in this way is wound by a continuous conductor, an extra bridge conductor 6*a* for bridging between the terminal 4*a* provided on the bobbin 2 winding this coil 3, and the terminal 4*b* of the bobbin 2 winding the previous coil 3, and it must be cut off and removed.

The cutting and removing method of the conventional bridge conductor 6*a* is described below. FIG. 14 shows an example of cutting and removing the bridge conductor 6*a* in a partially magnified view of FIG. 13.

In FIG. 14, the mounting arm 1 is moved to the position 1*b* in FIG. 13. A holding mechanism 10 comprises chuck claws 11*a*, 11*b* for holding the bridge conductor 6*a*, and moves in the direction of arrow B and in the direction of arrow B' in a specific range, and the chuck claw 11*a* is displaced in the direction of arrow C, while the chuck claw 11*b* is simultaneously displaced in the direction of arrow D, thereby holding the bridge conductor 6*a*.

Firstly, the holding mechanism 10 moves in the direction of arrow B to the position where the chuck claws 11*a*, 11*b* hold the bridge conductor 6*a*. At this position, the chuck claw 11*a* is displaced in the direction of arrow C, and the chuck claw 11*b* is displaced in the direction of arrow D, thereby holding the bridge conductor 6*a* firmly. FIG. 14 shows the state of holding the bridge conductor 6*a*.

In this state, the holding mechanism 10 moves in a specific range in the direction of arrow B'. At this time, the bridge conductor 6*a* is cut off as a tension is applied by the terminal 4*b* and chuck claws 11*a*, 11*b*.

In such cutting method, however, stable cutting position is not obtained, and an extra conductor is left over at the terminal 4*b*, and the undesired conductor cannot be removed completely, and a short undesired conductor is left over. This short undesired conductor seriously affects the quality of the coil parts such as short circuit.

SUMMARY OF THE INVENTION it is a first object of the invention to present a conductor cutting method capable of securely stabilizing the cutting position when cutting a conductor by applying a tension.

It is a second object thereof to stabilize the quality of coil parts by completely removing the short undesired conductor.

To achieve the first object of the invention, the cutting position of the conductor is heated to provide a temperature difference of 20° to 300° C., preferably 20° to 150° C., from other parts, and a tension is applied in this state to cut off.

Or, the cutting position of the conductor is heated to provide a temperature difference of 20° to 300° C., preferably 20° to 150° C., from other parts, and a bending stress and a tension are applied in this state to cut off.

To achieve the second object, the cutting position of the conductor is heated to provide a temperature difference of 20° to 300° C., preferably 20° to 150° C., from other parts, a tension is applied to cut off the conductor, from which a coil part is composed.

Or, the cutting position of the conductor is heated to provide a temperature difference of 20° to 300° C., preferably 20° to 150° C., from other parts, a bending stress and a tension are appalled to cut off the conductor, from which a coil part is composed.

In this way, by applying a tension and cutting off with a temperature difference of 20° to 300° C. provided from other parts by heating the cutting position of the conductor, the change of tensile force by temperature difference can be utilized, and therefore the heated cutting position is lowered In tensile force as compared with the other parts, and by applying a tension, a concentrated stress is added to generate a large distortion, thereby cutting off.

Generally, the conductor for composing a coil part is formed in an insulating coat film by urethane resin, but by defining the upper 11 melt of the temperature for locally heating the cutting position at 300° or preferably 150° C., the insulation performance of the insulating coat film of the coil portion is not lowered by heating.

Or, by applying a bending stress and a tension and cutting off with a temperature difference of 20° to 300° C. provided from other parts by heating the cutting position of the conductor, the heated cutting position is lowered in tensile force as compared with the other parts, and by applying a bending stress and a tension, a concentrated stress is added to generate a large distortion, thereby cutting off.

Moreover, by composing a coil part from the conductor being cut off by applying a tension in the state of a temperature difference of 20° to 300° C. provided from other parts by heating the cutting position of the conductor, the cutting position of the conductor is stable, and short undesired conductor is not left over at the terminal, and quality problem due to remaining of undesired conductor does not occur.

Still more, by composing a coil part from the conductor being cut off by applying a bending stress and a tension in the state of a temperature difference of 20° to 300° provided from other parts by heating the cutting position of the conductor, the conductor is cut off at the bending stress applied position and the cutting position is stable, and short undesired conductor is not left over at the terminal, and quality problem due to remaining of undesired conductor does not occur.

DESCRIPTION OF THE PREFERRED EMBODIMENTS

A first embodiment of the invention is described below with reference to FIGS. 1(*a*) to (*c*).

Figure 1A:
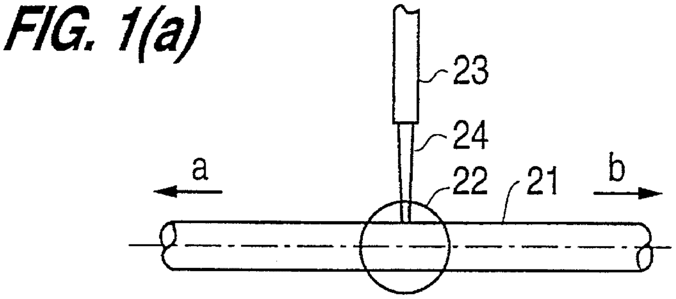
FIG. 1(*a*) to (*c*) show cutting processes of a conductor cutting method in a first embodiment of the invention.
Figure 1B:
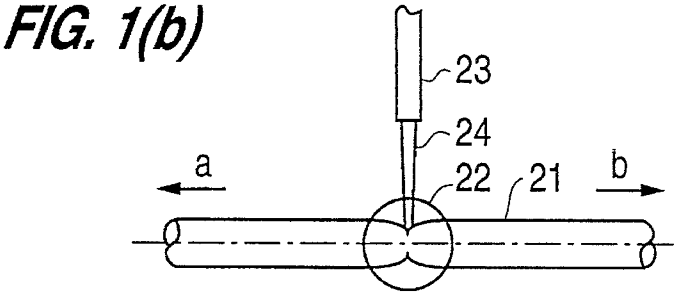
Figure 1C:
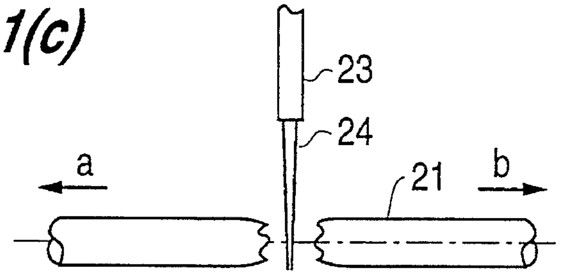

FIGS. 1(*a*) to (*c*) show cutting processes of the conductor cutting method in the first embodiment of the invention. in FIG. 1, the cutting processes of a conductor 21 is described. Firstly. an infrared ray beam 24 emitted from an infrared ray beam source 23 is emitted to a cutting position 22 of the conductor 21. The cutting position 22 illuminated with the infrared ray beam 24 is heated to a higher temperature than the other parts (or other portion) of the conductor by 20° to 300° C., preferably 20° to 150° C., so that the tensile force is lowered as compared with the other parts. in this state, as shown in FIG. 1(*a*), both ends of the conductor 21 are pulled in the direction of arrows a and b, and a tension is applied. When the tension is continuously applied to the conductor 21, the cutting position 22 illuminated with the infrared ray beam 24 is deflected as shown in FIG. 1(*b*). When the tension is further applied, the conductor 21 is cut off at the deflected portion as shown in FIG. 1(*c*).

In this way, by applying a tension and cutting off in the state of a temperature difference of 20° to 300° C., preferably 20° to 150° C., provided from other parts by heating the cutting position 22 of the conductor 21, the change of tensile force by temperature difference can be utilized, and therefore the heated cutting position 22 is lowered in tensile force as compared with the other parts, and by applying a tension, a concentrated stress is added to generate a large distortion, thereby cutting off.

A second embodiment of the invention is described below with reference to FIG. 2.

Figure 2:
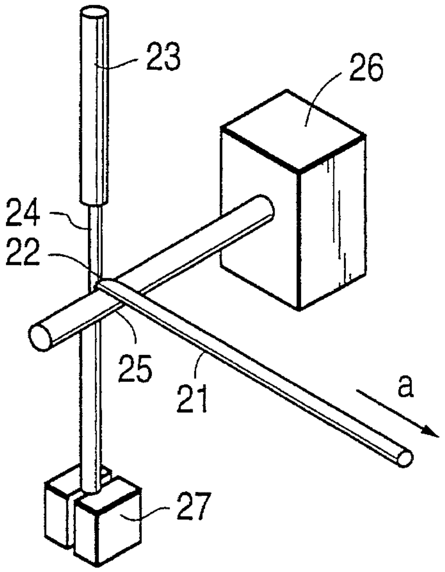
FIG. 2 is a perspective view showing an example of a conductor cutting method in a second embodiment of the invention.

FIG. 2 shows an example of cutting by heating the cutting position of a conductor, and applying a bending force and a tension. The cutting process of the conductor 21 is explained by referring to FIG. 2.

First, as shown in FIG. 2, one end of the conductor 21 is held and fixed by a fixing chuck 27. Next, the cutting position 22 is fitted to a winding bar (round or square bar) 25 fixed by a block 26, and the conductor 21 is folded and a bending force is applied. The folded portion is heated by an infrared ray beam 24 emitted from an infrared ray beam source 23. The cutting position 22 illuminated with the infrared ray beam 24 is heated to a higher temperature from other parts by 20° to 300° C., preferably 20° to 150° C.

In this state, a tension is applied in the direction of arrow a to the other end of the conductor 21 being not fixed. The cutting position 22 is heated by the infrared ray beam 24 and is lowered in tensile force, and the bending force and tension are applied, and the stress is concentrated in the bending force applied position by the synergistic effect, and therefore the cutting position 22 is cut off more stably than in the case of cutting by heating and applying tension as in the first embodiment.

in this way, when the cutting position 22 of the conductor 21 is folded and heated, and given a tension, the cutting position 22 becomes stabler.

In the first and second embodiments, meanwhile, the cutting position 22 of the conductor 21 is heated by the infrared ray beam 24, but it is not limited to the infrared ray beam alone.

Figure 3A:
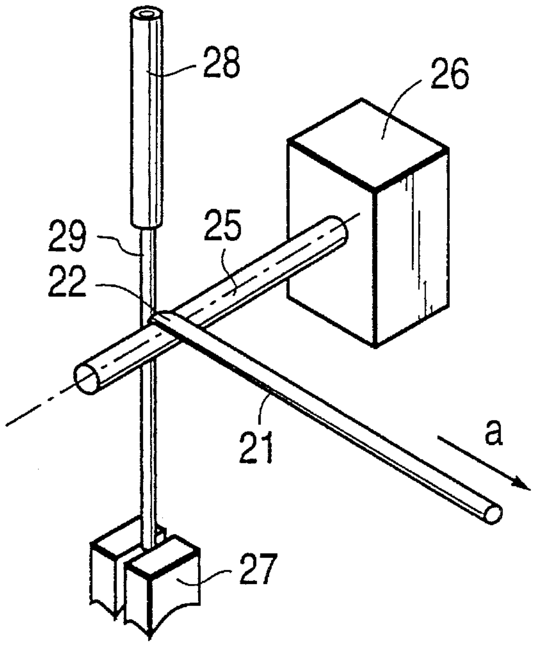
FIGS. 3(*a*), (*b*) are perspective views of other example of the conductor cutting method in the second embodiment of the invention.
Figure 3B:
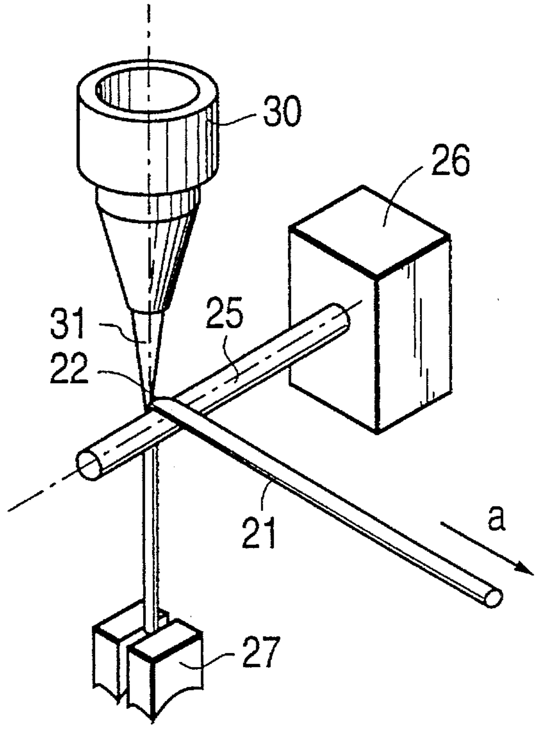

In FIG. 3(*a*), the cutting position 22 of the conductor 21 is heated by hot air 29 injected from a heating hot air nozzle 28, and in FIG. 3(*b*), the cutting position 22 of the conductor 21 is heated by a laser beam 31 from a heating laser beam source 30. Thus, by heating the cutting position 22 of the conductor 21 by the hot air 29 or laser beam 31 and applying a tension, the conductor 21 can be cut off. In FIG. 3, the same parts as in FIG. 2 are identified with same reference numerals.

In the foregoing embodiments, the cutting position 22 of the conductor 21 is heated from outside to a temperature higher than the other parts by 20° to 300° C., preferably 20° to 150° C., but the temperature difference may be also provided by self-heating by winding the conductor 21 around the winding bar 25 shown in FIG. 2.

A third embodiment of the invention is described below with reference to FIG. 4.

In the first and second embodiments, in order to cut off the conductor 21, the cutting position 22 of the conductor 21 is directly heated by a heat source.

Figure 4:
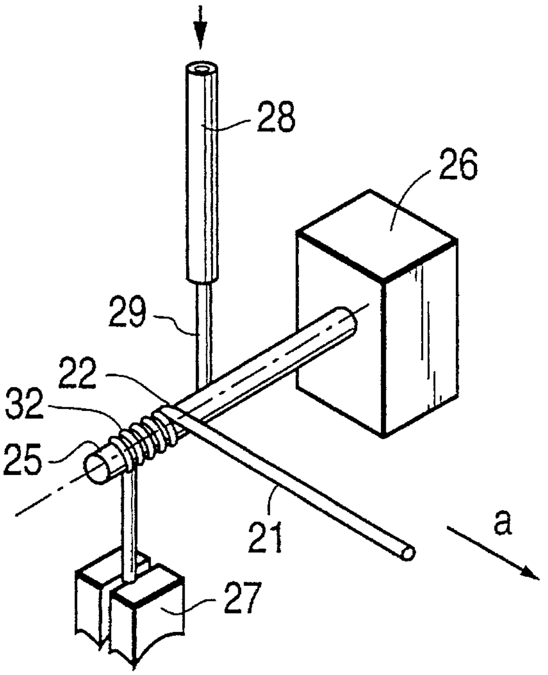
FIG. 4 is a perspective view showing a conductor cutting method in a third embodiment of the invention.

In FIG. 4, the conductor 21 is wound around the winding bar 25 to applying a bending force, and the winding bar 25 is heated by hot air 29 injected from a heating hot air nozzle 28, thereby heating the conductor 21 by conduction heat.

The cutting process in FIG. 4 is explained below. First, the conductor 21 is wound around the winding bar 25 as shown in the drawing to form a winding part 32. in this case, the position first contacting with the winding start conductor 21 and winding bar 25 is the cutting position 22. One end of the wound conductor 21 is firmly held by a fixing chuck 27. The portion of the winding bar 25 not wound with the conductor 21 is heated by the hot air 29 blown out from the heating hot air nozzle 28. In this state, the other free end of the conductor 21 is pulled in the direction of arrow a to apply a tension to the conductor 21, so that it is securely cut off at the first contacting position of the conductor 21 and winding bar 25, that is, at the specified cutting position.

Figure 5A:
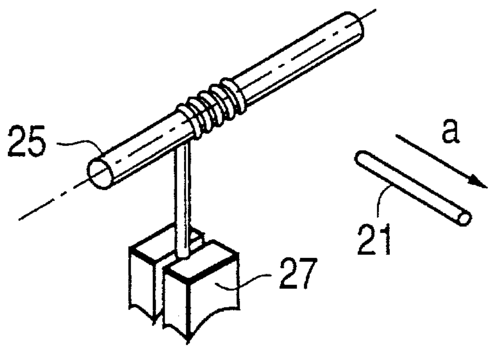
FIGS. 5(*a*), (*b*) are perspective views showing an example of result of cutting by the same conductor cutting method.
Figure 5B:
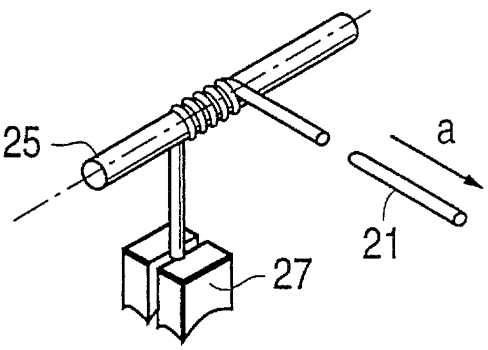
Figure 6:
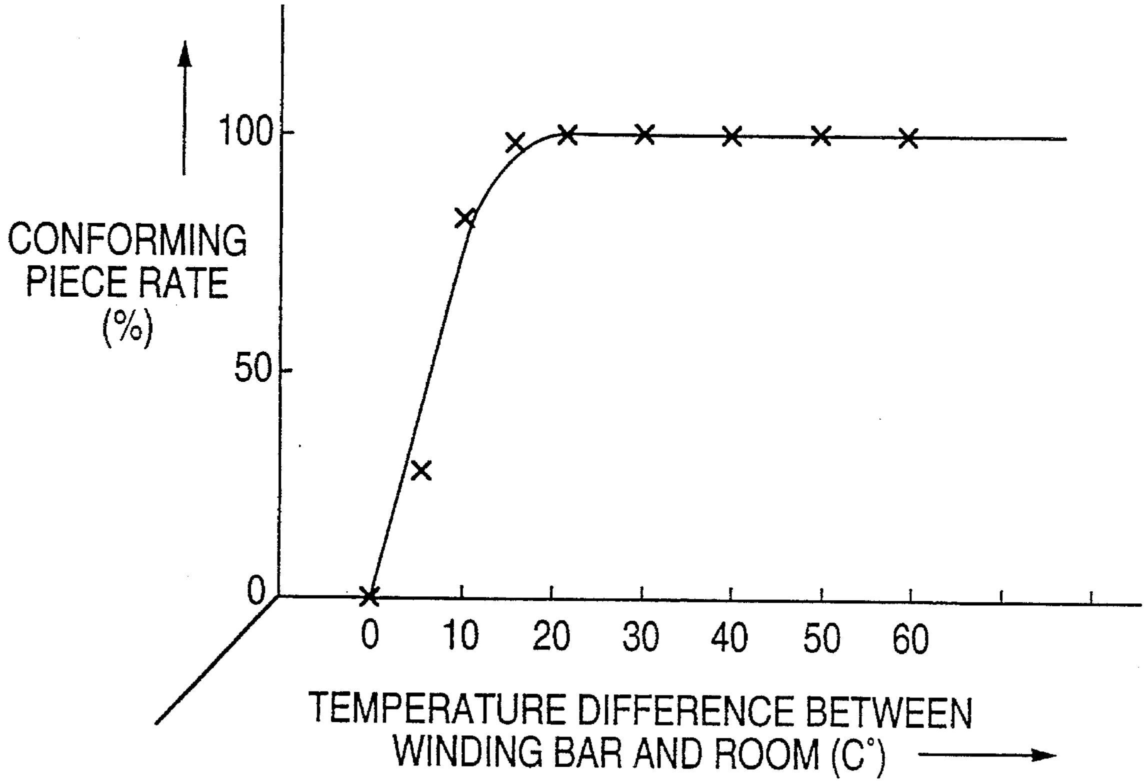
FIG. 6 is a characteristic diagram showing the result of cutting the conductor by the same conductor cutting method.

An example of the result of the cutting experiment explained in FIG. 4 is shown in FIG. 5(*a*), (*b*) and FIG. 6. FIG. 5(*a*) is perspective view showing the state of cutting at the position of first contact between the conductor 21 and winding bar 25, in which the specified position is cut off. As shown in FIG. 5(*a*), it is a conforming piece when cut at the specified position. FIG. 5(*b*) shows cutting at other than specified position. As shown in FIG. 5(*b*), it is a defective piece when cut at other than specified position.

The result of the experiment is graphically shown in FIG. 6. In FIG. 6, the axis of ordinates represents the probability of the number of times of being cut at the position shown in FIG. 5(*a*), out of the number of times of cutting the conductor 21 in the method explained in FIG. 4, that is, the conforming piece rate, and the axis of abscissas denotes the difference between the room temperature and the heating temperature of the winding bar 25 when cutting the conductor 21.

In this experiment, if the temperature difference between the winding bar 25 and the room is 20° or more, the conforming piece rate is 100%, and hence it is very easy to manufacture the device for heating the winding bar 25.

In this way, the method of cutting the conductor 21 in the state of temperature difference provided from other parts by heating the cutting position 22 is effective means for stabilizing the cutting position 22, and is extremely effective for completely removing the undesired conductor of the conductor 21 wound on the coil terminal.

As a fourth embodiment of the invention, the example of cutting the undesired conductor of the conductor wound on the terminal of the coil part is described with reference to FIGS. 7 to 9.

Figure 7:
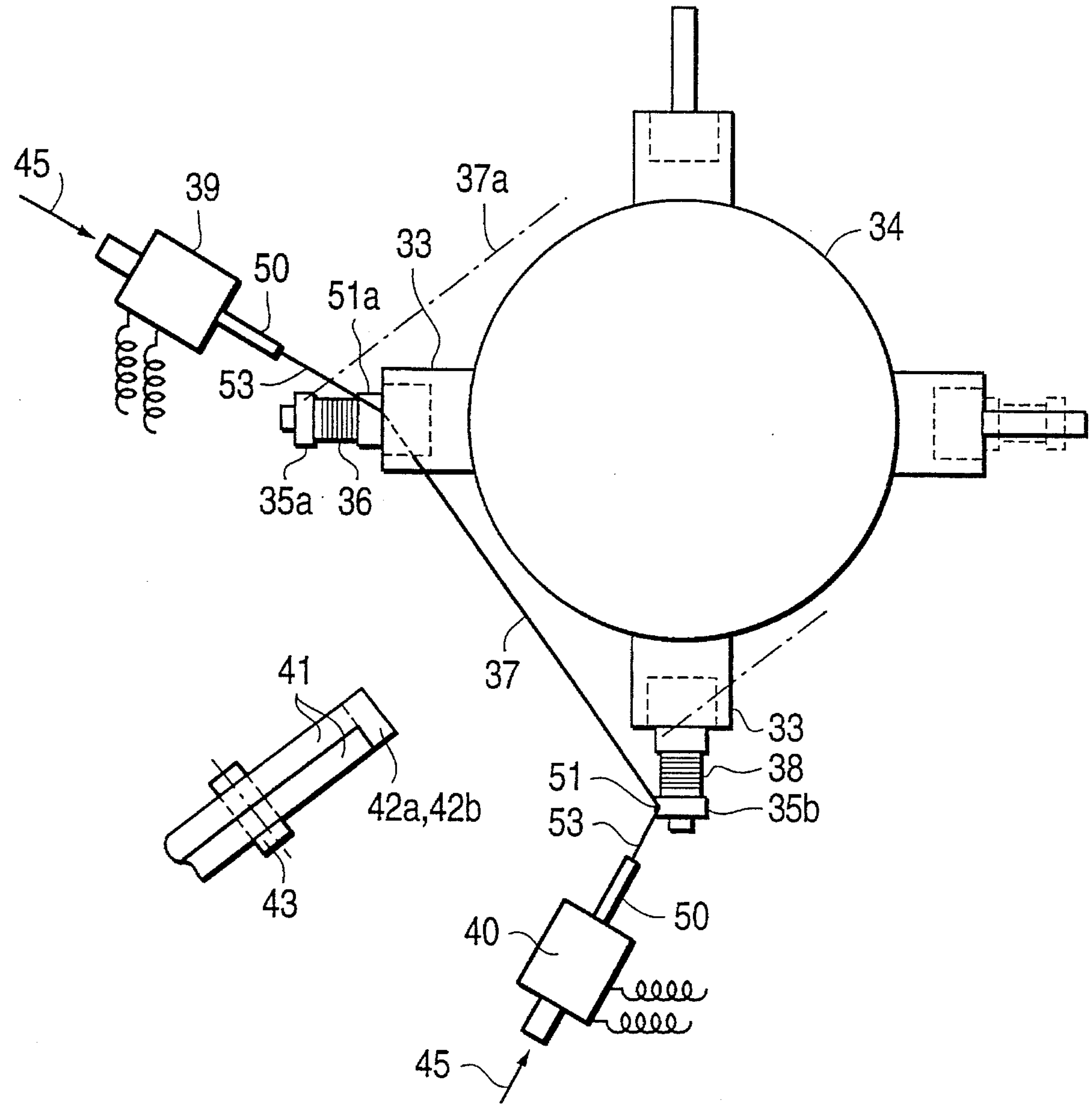
FIG. 7 is a plain view of a winding device by a conductor cutting method in a fourth embodiment of the invention.

FIG. 7 is a plain view showing the constitution of the winding device of the coil part, in which mounting arms 33 are symmetrically mounted on four sides of a rotary shaft 34. The mounting arms 33 are provided with bobbins 35*a*, 35*b*, . . . , and conductors possessing urethane resin insulating coat are wound and bridged continuously in the sequence of coil 36, bridge conductor 37 and coil 38. On the other hand, at the positioned side of the bobbin 35*a*, a hot air generator 39 is disposed in the configuration as shown in the drawing, and at the positioned side of the bobbin 35*b*, similarly, a hot air generator 40 is disposed in the configuration shown in the drawing. in the middle between the bobbin 35*a* and bobbin 35*b*, a holding mechanism 41 capable of tearing apart the bridge conductor 37 is disposed in the configuration shown in the drawing. This holding mechanism 41 is disposed to be movable in and out of the bridge conductor 37, and chuck claws 42*a*, 42*b* for pinching the bridge conductor 37 are provided at the front end, and the chuck claws 42*a*, 42*b* open and close about a pin 43, and are designed to hold the bridge conductor 37. This action is conducted by making use of air cylinder, solenoid valve, and electric circuit for controlling the solenoid valve, which are not shown in the drawing.

Figure 8:
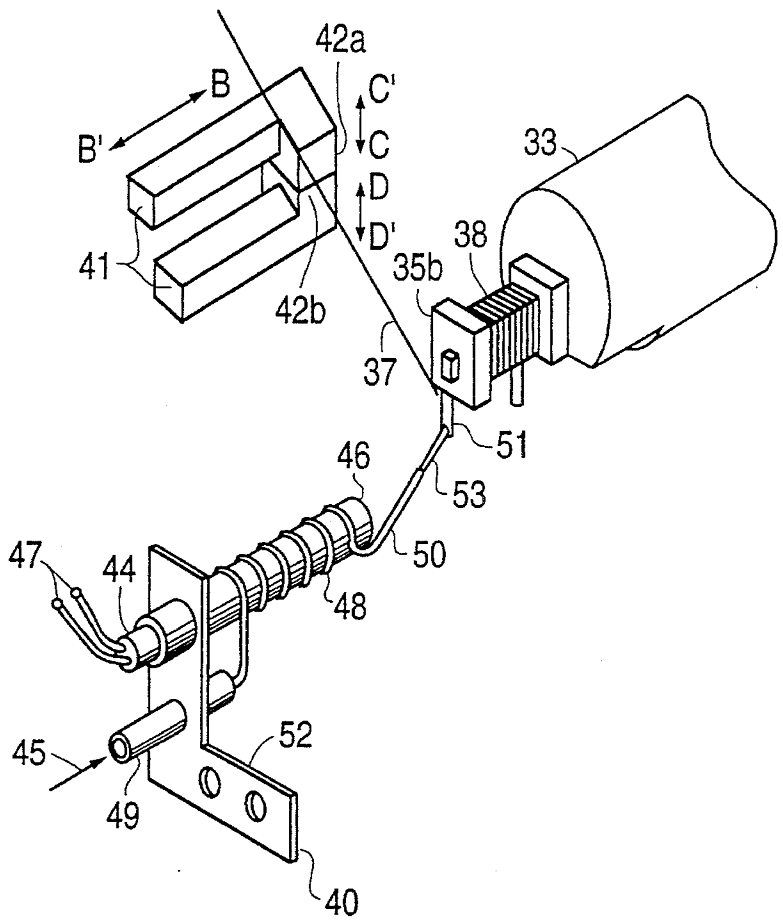
FIG. 8 is a perspective view of the heating part of the same winding device.

The hot air generator 40 is described in detail while referring to FIG. 8.

As shown in FIG. 8, a heating element 44 is to heat compressed air 45, and it is held by a holding pipe 46, and a current adjusted to a constant voltage through a conductor 47 is supplied to the heating element 44. By this current, the heating element 44 is heated to a specific temperature.

A capillary coil 48 is tightly wound around the holding pipe 46, and this capillary coil 48 is hollow, and one end thereof is designed to feed the compressed air 45 supplied through a copper pipe 49 without escaping outside, and the other end is integral with a nozzle 50. The nozzle 50 is positioned so as to blow out the compressed air adjusted to a specific pressure linearly, and blow to the front end of the terminal part of a terminal 51 provided in the bobbin 35*b*. A holding plate 52 is for fixing the holding pipe 46 and copper pipe 49.

The compressed air 45 supplied from outside into the copper pipe 49 is heated by the heating element 44 while passing through the capillary coil 48, and hot air 53 is blown out from the nozzle 50 to heat the terminal 51. The heated terminal 51 heats one end of the bridge conductor 37 by heat conduction.

In this state, the chuck claws 42*a*, 42*b* move in the direction of arrow B up to the position for holding the bridge conductor 37, and the chuck claw 42*a* is further displaced in the direction of arrow C, and the chuck claw 42*b* is simultaneously displaced in the direction of arrow D, and the holding mechanism 41 firmly grasps the bridge conductor 37. Afterwards, the holding mechanism 41 moves a specific extent in the direction of arrow B', and applies a tension to the bridge conductor 37 to cut off. On the other hand, one end of the bridge conductor 37 entangled around the terminal 51*a* provided in the bobbin 35*a* is heated by the hot air generator 39 in the method described above, and is cut off by the holding mechanism 41.

Figure 9A:
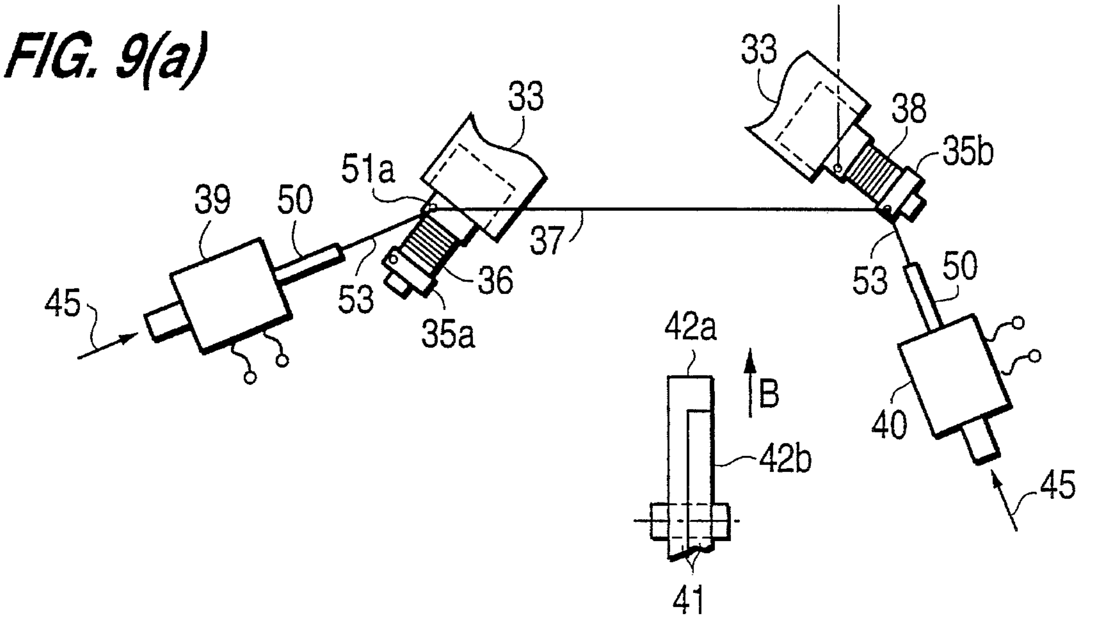
FIGS. 9(*a*) to (*c*) are plain views showing the action of the heating part of the same winding device.
Figure 9B:
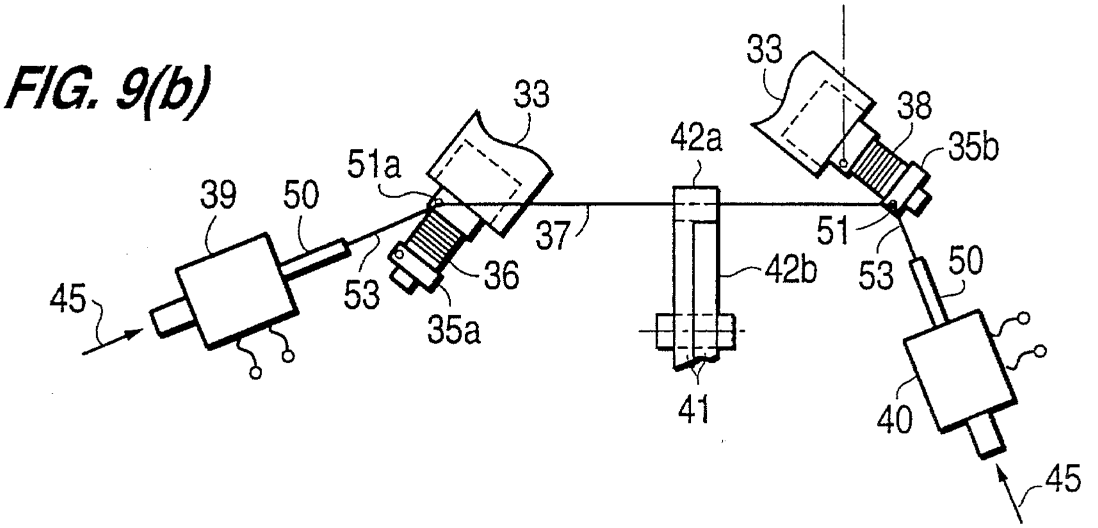
Figure 9C:
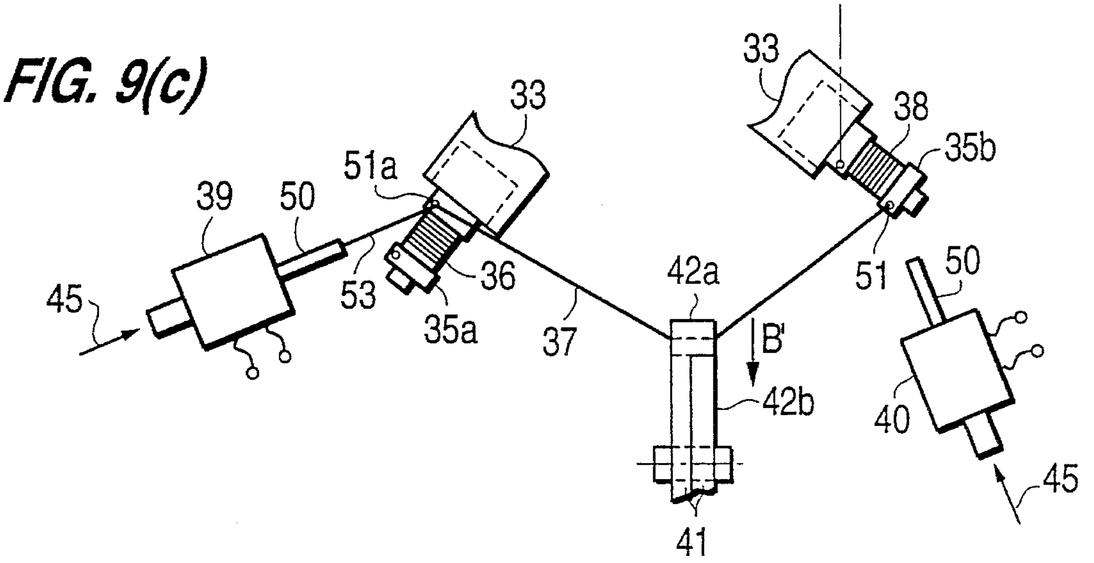

This action is described in detail while referring to FIGS. 9(*a*) to (*c*). Usually, as shown in FIG. 9(*a*), the hot air generators 39, 40 are positioned at a specific distance from the bobbins 35*a*, 35*b*, and the holding mechanism 41 is positioned at a specific distance from the bridge conductor 37, so as not to disturb the coil winding action, terminal winding action, displacing action of the mounting arms 33, and other mechanism actions. FIG. 9(*a*) shows the state in which winding process of coil and winding process on terminal are over, and the hot air 53 is blown to the terminal 51 by the hot air generators 39, 40. in this state, the holding mechanism 41 moves in the direction of arrow B, and holds the bridge conductor 37 by the chuck claws 42*a*, 42*b*. FIG. 9(*b*) shows the state of holding the bridge conductor 37*a*. The holding mechanism 41, in the state of holding the bridge conductor 37 by the chuck claws 42*a*, 42*b*, moves in the direction of arrow B' as shown in FIG. 9(*c*). The bridge conductor 37 is held by the chuck claws 42*a*, 42*b*, and as the holding mechanism 41 moves in the direction of arrow B', a tension is applied between the terminal 51*a* and terminal 51, and chuck claws 42*a*, 42*b*, and it is cut off at the terminal 51*a* and terminal 51. The cut-off bridge conductor 37 is discharged by a mechanism not shown in the drawing as the chuck claws 42*a*, 42*b* are cleared, thereby finishing the cutting process.

Thus, the winding device in the embodiment comprises hot air generators for heating the terminals winding the conductor, when cutting the conductor, and a holding mechanism capable of tearing apart the conductor to be cut off, and the conductor can be cut off from the terminal by displacing the holding mechanism holding the conductor to be cut off by always heating the terminal when cutting.

Figure 10:
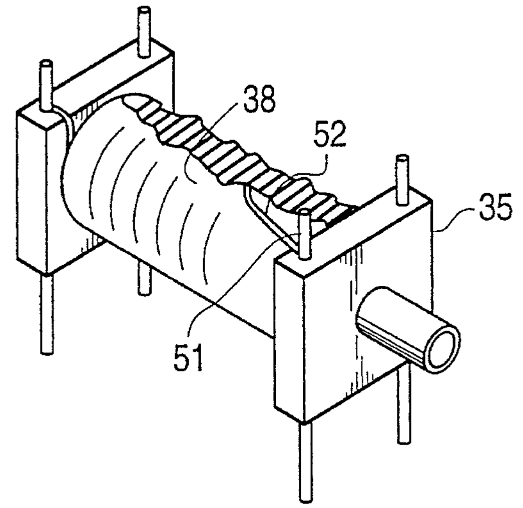
FIG. 10 is a perspective view of a coil part manufactured by the winding device by the conductor cutting method in the fourth embodiment of the invention.

As a result, as shown in FIG. 10, lead wires 52 at both ends of the coil 38 wound around the bobbin 35 are wound on the terminal 51, and the ends of the lead wires 52 are not left over projecting from the terminal 51, so that a coil part with stable quality is obtained.

An embodiment of a coil part by a conductor being cut off by the foregoing conductor cutting method is described below.

Figure 11A:
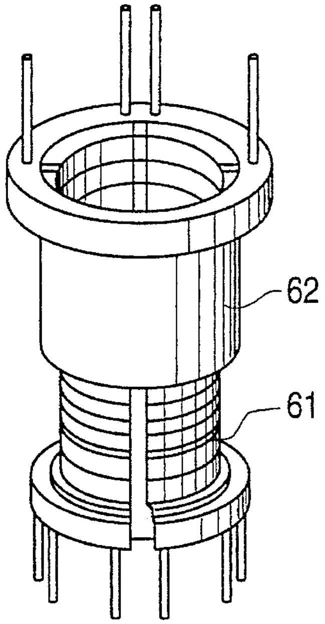
FIG. 11(*a*) is a perspective view of a coil part in a fifth embodiment of the invention, and FIG. 11(*b*) is a longitudinal sectional view of the same coil part.
Figure 11B:
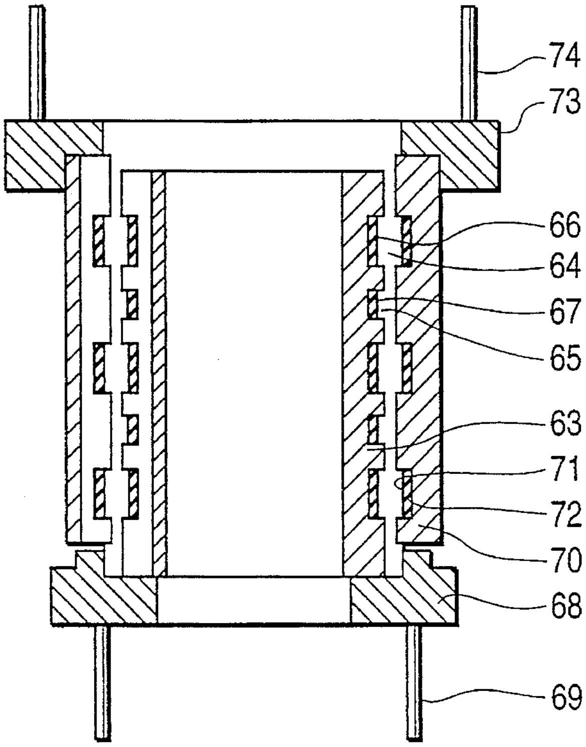

The embodiment shown in FIG. 11 relates to a coaxial rotary transformer for exchanging signals between the rotary head and fixed side to be used in a video tape recorder or the like.

In FIG. 11, an inner coil 61 is concentrically assembled in an outer coil 62. The inner coil 61 comprises plural circumferential grooves 64 for signal coil on the outer circumference of a cylindrical core 63, circumferential grooves 65 for short ring between these circumferential grooves 64 for signal coil, and a plurality of longitudinal grooves in the height direction, and a signal coil 66 is wound around circumferential grooves 64 for signal coil, and a short ring coil 67 winding the conductor two turns or more each is disposed in the circumferential grooves 65 for short ring, and the lead wire of the signal coil 66 is drawn out through the longitudinal groove, and is connected to a terminal 69 of a terminal plate 68 coupled with the lower end of the cylindrical core 63, and the short ring 67 is wound about each circumferential groove 65 for short ring, and the winding start and winding end of the short ring coil 67 are connected as being wound on one terminal 69 of the terminal plate 68.

The outer coil 62 comprises plural circumferential grooves for signal coil 71 and several longitudinal grooves in the inner circumference of a cylindrical core 70, and a signal coil 72 is wound in the circumferential grooves 71 for signal coil, and the lead wire of the signal coil 72 is passed through the longitudinal grooves, and is connected with a terminal 74 of a terminal plate 73 coupled with the upper end of the cylindrical core 70.

The signal coils 66 and 72 of the inner coil 61 and outer coil 62 are combined to confront each other.

In the coaxial type rotary transformer in such constitution, same as in the fourth embodiment, the lead wire of the signal coil 66 is wound around the terminal 69, and the lead wire of the signal coil 72 is wound around the terminal 74, and by applying a tension while heating the terminals 69, 74, short undesired conductor is not left over at the terminals 69, 74, so that quality problems due to remaining of undesired conductor may be eliminated.

Figure 12A:
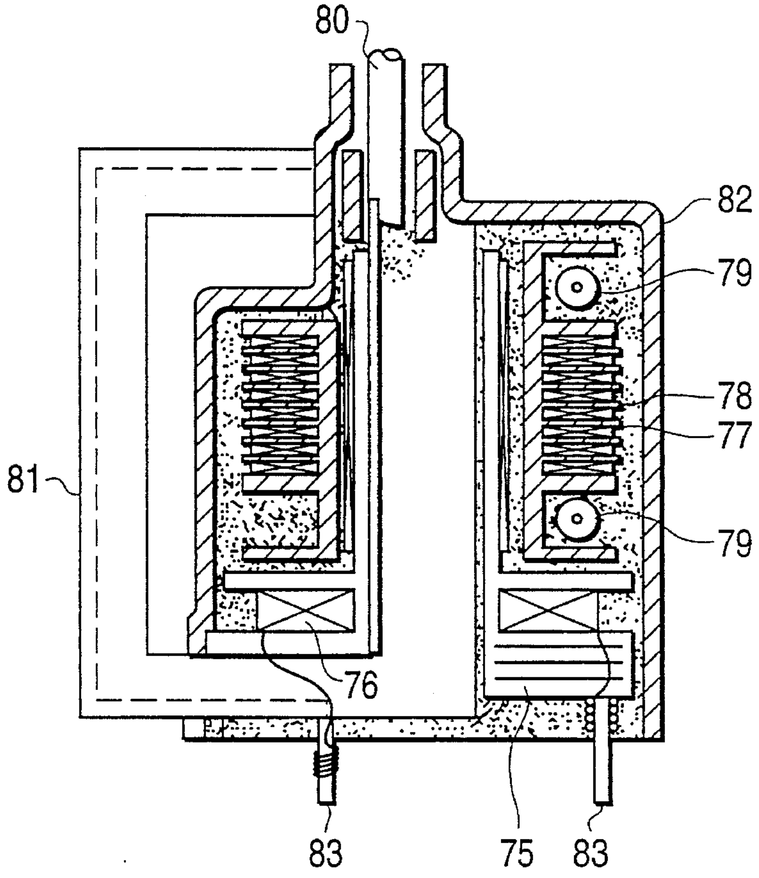
FIGS. 12(*a*), (*b*) are perspective views of a coil part in a sixth embodiment of the invention.
Figure 12B:
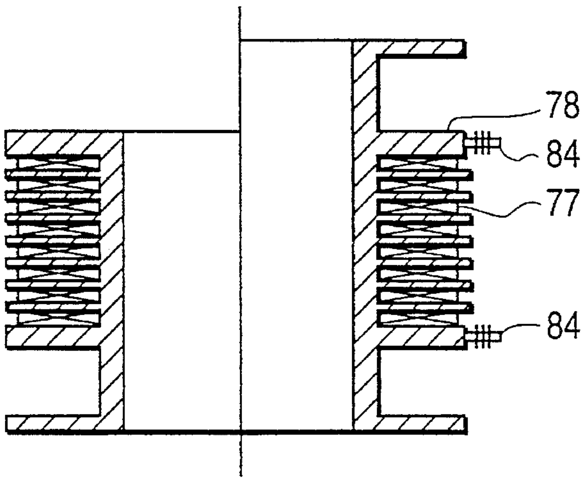
Figure 13:
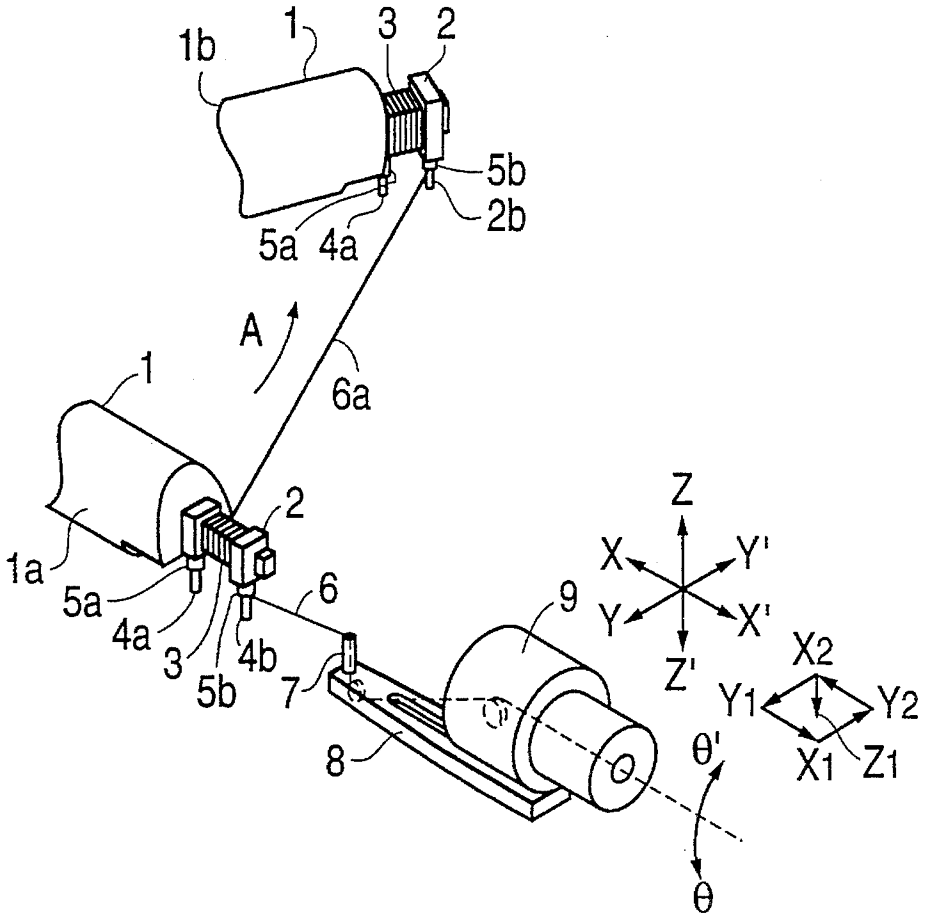
FIG. 13 is a perspective view of a winding device in a conventional winding method.
Figure 14:
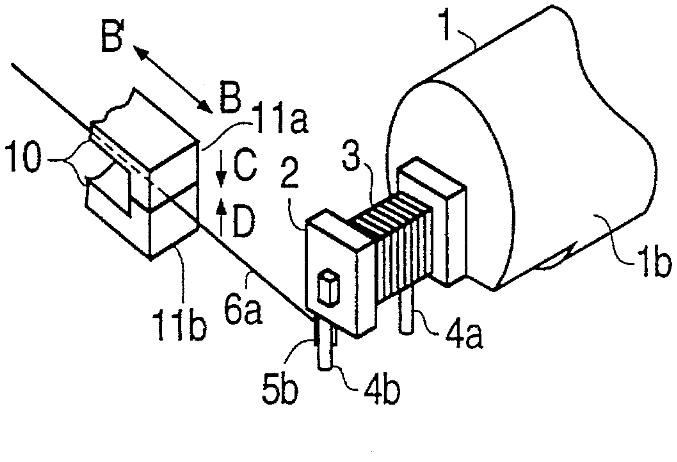
FIG. 14 is a perspective view showing a conductor cutting method of the same winding device.

The next embodiment shown in FIG. 12(*a*), (*b*) is a flyback transformer used in television receiver or the like.

FIG. 12(*a*) is a sectional view of an entire flyback transformer, and FIG. 12(*b*) is a sectional view of a high voltage coil part. A low voltage bobbin 75 turns around a low voltage coil 76, and a high voltage bobbin 78 winding a high voltage coil 77 in division is mounted on this low voltage bobbin 75. In the upper part and lower part of the high voltage bobbin 78, rectifying diodes 79 connected to the winding start side of the high voltage coil 77 are disposed. In the upper part of the high voltage bobbin 78, one end of an anode lead wire 80 is press-fitted. A magnetic core 81 is assembled into the assembly of such low voltage bobbin 75 and high voltage bobbin 78, and an insulation case 82 put over the entire surface to compose the flyback transformer.

The lead wire of the low voltage coil 76 turning around the low voltage bobbin 75 is wound on a terminal 83. The lead wire of the high voltage coil 77 turning around the high voltage bobbin 78 is wound on a terminal 84.

In thus composed flyback transformer, same as in the fourth embodiment, the lead wire of the low voltage coil 76 is wound the terminal 83, and the lead wire of the high voltage coil 77 is wound around the terminal 84, and by applying a tension while heating the terminals 83, 84, short undesired conductor is not left over at the terminals 83, 84, so that the quality problem due to remaining of undesired conductor may be eliminated.

What is claimed is:

1. A method of cutting a part of a conductor comprising, applying a tension to a part of a conductor and cutting in the state of temperature difference of 20° to 300° C. provided from other parts of the conductor by heating the cutting position of the conductor.

2. A method of cutting the part of the conductor of claim 1, characterized by applying a tension to the part of the conductor and cutting in the state of temperature difference of 20° to 150° C. provided from other parts of the conductor by heating the cutting position of the conductor.

3. A method of cutting the part of the conductor of claim 1, wherein the cutting position of the conductor is provided with the temperature difference by self-heating by plastic deformation of the conductor.

4. A method of cutting the part of the conductor of claim 1, wherein the cutting position of the conductor is provided with the temperature difference by heating from outside by force.

5. A method of cutting a part of a conductor comprising, applying a bending stress and a tension to a part of and cutting in the state of temperature difference of 20° to 300° C. provided from other parts by heating the cutting position of the conductor.

6. A method of cutting the part of the conductor of claim 5, characterized by applying a bending stress and a tension to the part of the conductor and cutting in the state of temperature difference of 20° to 150° C. provided from other parts by heating the cutting position of the conductor.

7. A method of cutting the part of the conductor of claim 5, wherein the cutting position of the conductor is provided with the temperature difference by heating the terminal provided on a winding element winding the conductor.

8. A method of cutting the part of the conductor of claim 5, wherein the cutting position of the conductor is provided with the binding stress by winding the conductor on the terminal of the winding element of the conductor.

9. A coil part comprised of a conductor, in which a short, undesired portion of the conductor is not left over at a terminal, wherein said conductor is cut to length by applying a bending stress and a tension to the conductor while a cutting position of the conductor is in the state of temperature difference of 20° to 300° C. provided from other parts of the conductor by heating the cutting position of the conductor.

10. A coil part of claim 9, comprised of a conductor, in which the short, undesired portion of the conductor is not left over at a terminal, wherein said conductor is cut to length by applying a bending stress and a tension to the conductor while a cutting position of the conductor is in the state of temperature difference of 20° to 150° C. provided from other parts of the conductor by heating the cutting position of the conductor.

11. A coil part including a terminal comprised of a conductor cut to length, said coil part not having a short undesired portion of the conductor left over at the terminal, said coil part made by a process comprising:

(a) heating a cutting position of a conductor so that temperature difference of the cutting position is 20° to 300° C. from other parts of the conductor, and (b) applying a bending stress and a tension to the conductor while maintaining the temperature difference of 20° to 300° of the cutting position of the conductor, thereby producing the coil part in which the short, undesired portion of the conductor is not left over at the terminal.

12. A coil part, of claim 11, including a terminal, comprised of a conductor cut to length, said coil part not having a short undesired portion of the conductor left over at the terminal, said coil part made by a process comprising:

(a) heating a cutting position of a conductor so that temperature difference of the cutting position is 20° to 150° C. from other parts of the conductor, and (b) applying a bending stress and a tension to the conductor while maintaining the temperature difference of 20° to 150° C. of the cutting position of the conductor, thereby producing the coil part in which the short undesired portion of the conductor is not left over at the terminal.

* * * * *